May 18, 1954
D. G. SLOVIN
2,678,676
APPARATUS FOR FORMING RIBBONS COMPOSED
OF EXTRUDED RUBBER THREADS
Filed July 6, 1951
2 Sheets-Sheet 1
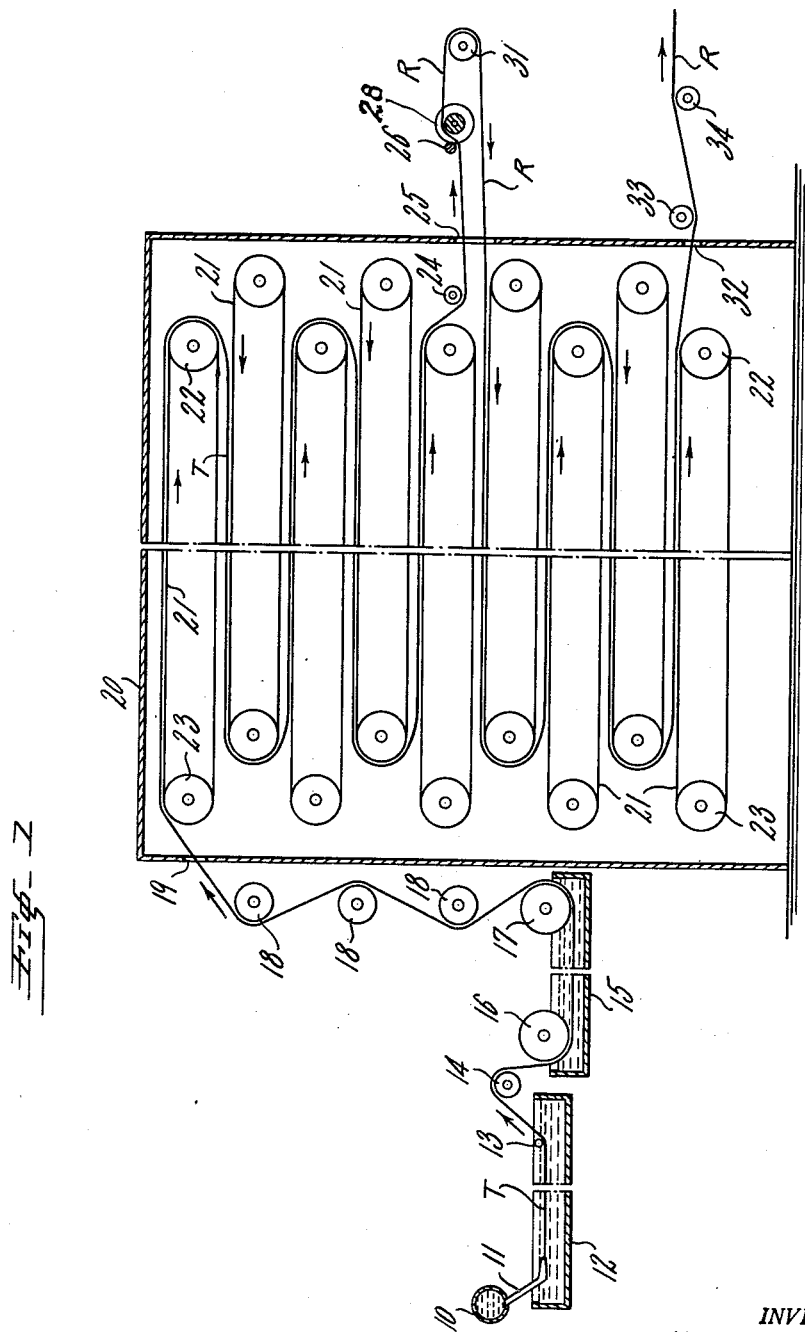
INVENTOR.
DAVID G. SLOVIN
BY
Charles C. Willson
ATTORNEY

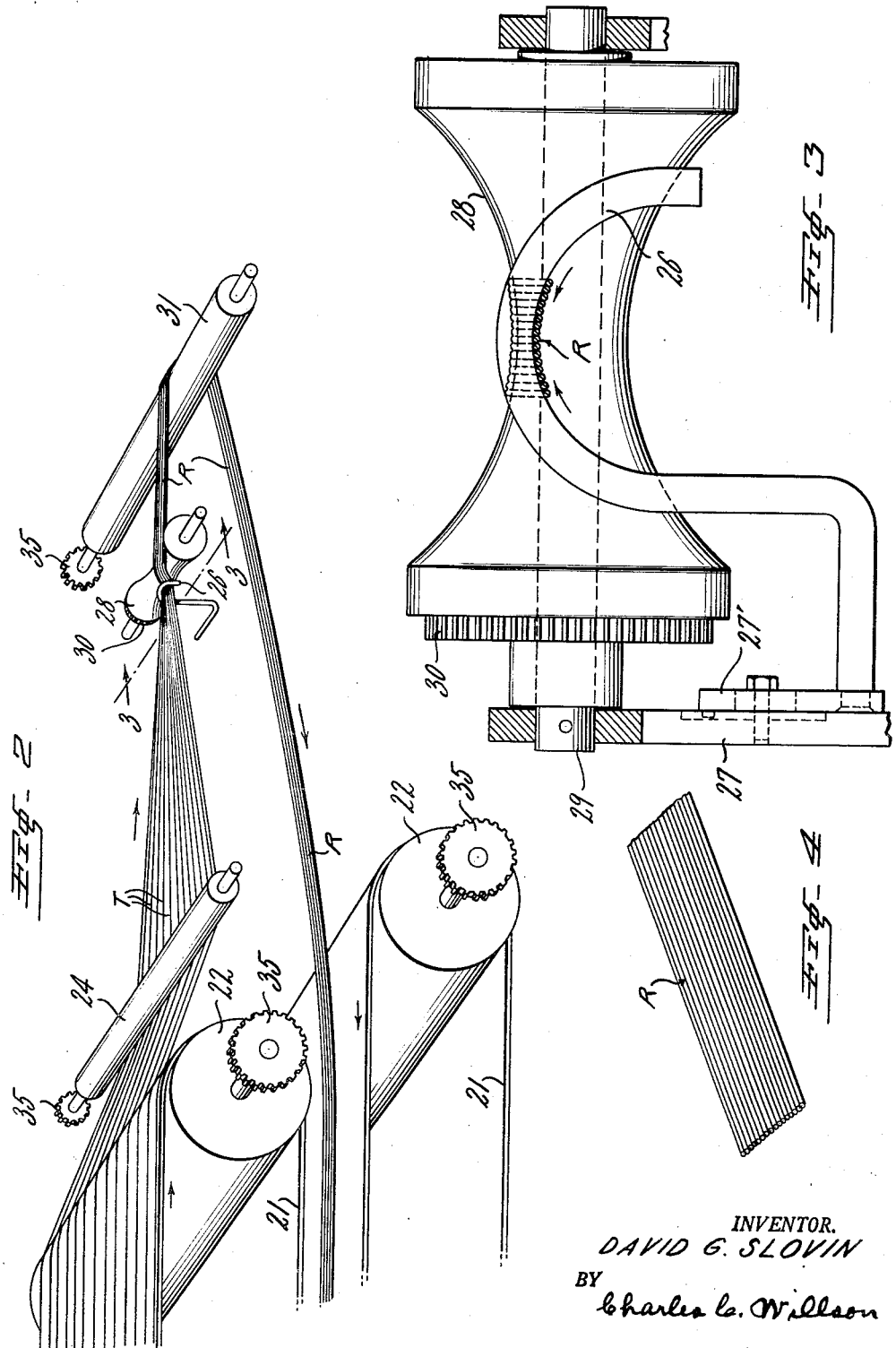

Patented May 18, 1954

2,678,676

UNITED STATES PATENT OFFICE 2,678,676

APPARATUS FOR FORMING RIBBONS COMPOSED OF EXTRUDED RUBBER THREADS

David G. Slovin, Providence, R. I., assignor to United States Rubber Company, New York, N. Y., a corporation of New Jersey Application July 6, 1951, Serial No. 235,541

4 Claims. (Cl. 154—1.7)

This invention relates to a ribbon composed of a series of extruded rubber threads separably stuck together so that they can be readily separated, and to the method of making the same.

The method disclosed in this application is claimed in my copending application 339,860, filed March 2, 1953.

For many years cut rubber thread and extruded rubber thread has been sold to the trade on individual spools, but the cost of such spools is appreciable as is also the cost of winding the thread on the individual spools.

There has been a trend for years towards selling cut rubber thread in the form of a ribbon formed of a series of cut threads slightly stuck together, as disclosed for example, in the Hazell Patent No. 2,323,132, so that the ribbon may be readily split into the individual threads adjacent the machine where the rubber threads are embodied in a textile fabric, or are covered to produce covered elastic yarns.

It now appears desirable to also sell extruded latex thread in the form of a ribbon formed of slightly connected extruded threads so that they can be readily separated from each other when desired. However, these round extruded rubber threads after they are vulcanized, cannot be formed into a ribbon by the method taught by the Hazell patent just mentioned.

It is known that if freshly extruded latex threads are brought together in the coagulating bath or as they are leaving such bath, their tacky surface will cause them to stick firmly together so that when they are vulcanized the bond between the threads will be so strong that it is practically impossible to separate the threads without breaking them.

Having in mind the foregoing, the present invention contemplates forming a ribbon of extruded rubber threads held together solely by the tacky condition of the surfaces of such threads, but in order to prevent the bond between the threads from becoming so strong that the threads cannot be separated after they are vulcanized, I propose, in accordance with the present invention, to keep the freshly extruded rubber threads out of contact with each other while they are being advanced in an oven or drier, until their surfaces are only slightly tacky, and then causing them to contact each other to form a flat ribbon.

Such a ribbon is formed in accordance with the preferred embodiment of the invention by delivering the freshly extruded latex threads onto a conveyor apron, or successive aprons, in spaced relation to each other to advance them in a drying chamber, and when these threads are nearly dry so that their surfaces are only slightly tacky, they are brought into contact with each other as they advance by passing them over a specially constructed ribbon forming roller. This roll is power driven and is provided with a concave peripheral surface, that acts upon the slightly tacky threads to direct them into contact with each other, without causing them to overlap or to be deformed by the forces to which they are subjected. As these threads leave this forming roll in the form of a ribbon, the ribbon is preferably delivered to another conveyor apron and subjected to heat high enough to vulcanize the threads forming the ribbon. This completes the operation of producing the ribbon herein contemplated except for winding it on to a shipping spool or folding it back and forth into a carton ready for shipment to a customer.

The apparatus employed to carry out the above described method and which gives a nice control over the lateral forces used to direct the threads, which are tacky and easily deformable, into contact with each other preferably comprises; (1) a guide roll disposed near the discharge end of a run of a belt which delivers the nearly dry threads, and that is driven at the approximate speed of the belt and is positioned to exert a downward pressure on the threads to prevent them from shifting as they approach the discharge end of the belt; (2) a curved gathering bar which serves to direct the outermost threads inwardly towards each other; (3) a forming roll that is driven at a relatively high speed and which has a concave peripheral surface that acts upon the tacky threads to cause them to contact each other and form the desired ribbon; and (4) a ribbon delivery roll about which the newly formed ribbon passes on its way to the vulcanizer.

The above and other features of the apparatus and method of the present invention will be further understood from the following description when read in connection with the accompanying drawings; wherein Fig. 1 is a vertical sectional view showing schematically apparatus for carrying out the present invention;

Fig. 2, on a larger scale, is a perspective view of the apparatus shown in Fig. 1 for bringing the spaced threads together into contact with each other to form the desired ribbon;

Fig. 3 on a larger scale is a sectional view taken substantially on the line 3—3 of Fig. 2; and Fig. 4 is a perspective view of the finished ribbon formed of the extruded rubber threads.

The apparatus shown in Fig. 1 of the drawing is or may be, for the most part, of well known construction, except for the means which is employed to bring the laterally spaced threads into contact with each other to form the ribbon.

At the left-hand side of the drawing in Fig. 1, there is shown latex extruding means comprising a latex supply pipe 10, having extending downwardly therefrom in an inclined direction into a coagulant bath a large number of extruding nozzles 11. These nozzles which are spaced a short distance apart are preferably in the form of small glass tubes each having a discharge aperture that is carefully shaped to produce a thread of the desired diameter. These nozzles discharge the extruded latex into a coagulant such as an acid confined in the tank 12, and after these extruded threads T have travelled a substantial distance in the coagulant, they pass under a transverse bar 13 which holds them depressed in the bath, and then upwardly over a power driven roll 14 which serves to pass the threads into the washing tank 15 containing water. The threads T are held depressed in this water bath by the power driven rolls 16 and 17. As the spaced threads leave this washing bath, they preferably pass upwardly in contact with the guiding and advancing rollers 18, to pass through a slot 19 in a sidewall of the drying and vulcanizing oven 20. This oven is shown as having a number of power driven conveyor aprons 21 therein which are supported and operated by the spaced drums 22 and 23. These aprons which may be formed of asbestos fabric are disposed one below the other, as shown, so that the threads T which are deposited onto the uppermost apron will pass downwardly by gravity from one conveyor apron to another, so that the aprons will advance the threads, disposed thereon in spaced relation to each other, back and forth within the drier as indicated by the arrows.

After the threads T have been advanced in the oven 20 by a number of the conveyor aprons 21 and are nearly dry so that their outer surfaces are only slightly tacky, they are ready to be brought into contact with each other to form a ribbon, in accordance with the present invention. The ribbon is formed by providing a guide roll or depressing roll 24 near the discharge end of an apron 21 as shown, so that the threads T will pass downwardly in an inclined direction to the lower side of this roll, which is driven at approximately the same speed as the apron that delivers the threads to this roll. The purpose of this roll 24 is to prevent the threads from rolling on the apron near its end, under the influence of the thread gathering means now to be described.

As the threads leave this guide roll 24, they may pass out of the oven through an opening 25 as they approach a curved gathering bar 26, see Figs. 2 and 3. This gathering bar which is curved in the shape of a semi-circle is supported by an upright or support 27 so that it may be raised or lowered to vary the pressure its curved surface exerts upon the threads T so as to cause them to converge as they pass from the guide roll 24 to this gathering bar 26. This bar is secured to a plate 27' which is adjustably secured to the support 27, and as will be apparent from Figs. 1 and 2 is disposed close to a forming roll 28 which is shown in Fig. 3 as rotatably mounted on the fixed shaft 29 secured to the support 27. This forming roller is driven at a much higher surface speed than the threads T travel, by any suitable driving means such as a gear 30. The roll 28 as will be apparent from Fig. 3 has a small central diameter and large end diameters and is provided with a concave peripheral surface. This roll which has a smooth highly polished surface may be made of wood or metal and is positioned so that the threads will pass over its upper surface as shown in Fig. 2, and the threads are forced downwardly into contact with its curved upper surface by the gathering bar 26 as will be apparent from Fig. 2. The gathering bar may be formed of glass, or of metal having a smooth highly polished surface and the function of this bar 26 is primarily to gather the outermost threads T inwardly towards each other in the direction indicated by the small arrows in Fig. 3. The curved upper surface of the rapidly rotating roll 28 serves, in cooperation with the bar 26, to force all of the threads into contact with each other without piling one on top of another and without exerting sufficient pressure upon these unvulcanized threads to cause them to deform appreciably. The desired ribbon R is formed as the threads pass over the forming roll 28, and as the ribbon leaves this roll it preferably passes around a ribbon delivery roll 31 which is driven at approximately the same surface speed as the belts 21. This roll 31 controls the contact the ribbon makes with the forming roll 28.

The ribbon R is shown as passing from the roll 31 back through an opening 25 in the oven onto a conveyor apron 21 to be advanced back and forth in the lower portion of this oven by the conveyor aprons shown. The upper portion of the oven above the level of the roll 24 is maintained at a temperature of approximately 220° F. so as to rapidly dry the threads but not vulcanize them. The lower portion of the oven below this roll 24 is maintained at a much higher temperature of approximately 400° F. to vulcanize the threads of the ribbon R, and after the threads are sufficiently vulcanized, the ribbons pass out of the ovens through an opening 32 to engage the driven rollers 33 and 34. It now forms the finished ribbon R shown in Fig. 4 of the drawing.

The aprons 21, guide roll 24, and ribbon roll 31, are all driven at about the same speed and are shown as provided with the driving gears 35. An approximate uniform speed through the machine is used so as not to stretch the threads T or ribbon R appreciably.

The curved gathering bar 26 and rotating forming roll 28 are so positioned with respect to the path travelled by the threads T that the threads have a small area of contact with the bar and with the roll, and the retarding force exerted on the threads by the bar 26 is overcome by the advancing pull exerted on the threads by the rapidly rotating forming roll 28. Since the extruded latex threads T are brought into contact with each other when they are nearly dry, but unvulcanized, they are still in a tender condition and must be carefully handled so as not to deform them. The guide bar 26 and forming roll 28 cooperate nicely to exert enough pressure on the threads to cause them to adhere one to the other throughout their length without deforming them.

In forming the ribbon R what is desired is a sufficient bond to hold the individual threads in the ribbon formation so that they will not pull apart when the ribbon is handled but may be easily separated when the threads are to be used. The proper bond can be easily secured in the present invention by drying the threads to the proper degree before bringing them together.

Having thus described my invention, what I claim and desire to protect by Letters Patent is:

1. A machine for forming a flat ribbon composed of a series of extruded rubber threads separately stuck together, comprising means for extruding latex through orifices into a tank containing a coagulant for the latex, conveyor means for advancing the extruded latex in the form of spaced threads through a drier, a power driven roller for receiving the threads from the conveyor when they are nearly dry said roller having a concave peripheral surface, means for pressing the threads against said surface so as to bend them part way around the roller to cause this moving surface to force the advancing threads into contact with each other to form a flat ribbon in which the threads are held together by their tacky surfaces, and means for vulcanizing the ribbon to thereby form a ribbon in which the threads can be readily separated.

2. A machine for forming a flat ribbon composed of a series of extruded rubber threads separably stuck together, comprising means for extruding latex through orifices into a tank containing a coagulant for the latex, conveyor means for advancing the extruded latex in the form of spaced threads through a drier, a power driven roller for receiving the threads from the conveyor when they are nearly dry, a curved gathering bar between said conveyor means and roller for urging the threads towards each other and operable to bend the threads part way around the roller, said roller having a concave peripheral surface for forcing the threads into contact with each other to form a flat ribbon in which the threads are held together by their tacky surface, and means for vulcanizing this ribbon.

3. A machine for forming a flat ribbon composed of a series of extruded rubber threads separately stuck together, comprising means for extruding latex through orifices into a coagulating tank, a drying and vulcanizing oven provided with a number of conveyor belts disposed one below the other and operable to advance the extruded latex in the form of threads back and forth in the oven, a power driven roller for receiving the threads from one of said belts when they are nearly dry said roller having a concave peripheral surface, means for pressing the threads against said surface so as to bend them part way around the roller to cause this moving surface to force the threads into contact with each other to form a flat ribbon in which the threads are held together by their tacky surfaces, and means for advancing this ribbon through the oven to vulcanize it.

4. A machine for forming a flat ribbon composed of a series of extruded rubber threads separably stuck together, comprising means for extruding latex through orifices into a coagulant to form latex threads, means for advancing the threads in spaced relation to each other and for drying them as they advance, a power driven roller for receiving these threads when they are in a nearly dry tacky condition said roller having a concave peripheral surface, means for pressing the threads against said surface so as to bend them part way around the roller to cause this moving surface to force the threads into contact with one another under slight pressure that does not deform them to provide a flat ribbon in which the threads are held together by their tacky surfaces, and means for vulcanizing the ribbon.

References Cited in the file of this patent

UNITED STATES PATENTS

| Number | Name | Date |
|--------|------|------|
| 787,886 | Anet | Apr. 25, 1905 |
| 1,871,412 | Hopkinson | Aug. 9, 1932 |
| 2,333,699 | Brosi | Nov. 9, 1943 |
| 2,441,071 | Jahant | May 4, 1948 |